Dec. 6, 1949 — L. A. V. ROZAS — 2,490,232
PARACHUTE CONTROL
Filed July 31, 1946 — 2 Sheets-Sheet 1

INVENTOR.
*Luis A. Villafuerte Rozas,*

BY *Victor J. Evans & Co.*

ATTORNEYS

Dec. 6, 1949 L. A. V. ROZAS 2,490,232
PARACHUTE CONTROL
Filed July 31, 1946 2 Sheets-Sheet 2

INVENTOR.
Luis A. Villafuerte Rozas,
BY Victor J. Evans & Co.
ATTORNEYS

UNITED STATES PATENT OFFICE 2,490,232

PARACHUTE CONTROL

Luis Alberto Villafuerte Rozas, Cuzco, Peru

Application July 31, 1946, Serial No. 687,318

1 Claim. (Cl. 244—152)

This invention relates to a parachute control which will speed the descent of the parachutist.

An object of this invention is to provide a control for a parachute which permits the wearer thereof to adjust as desired his rate of descent.

With the above and other objects and advantages in view the invention consists of the novel details of construction, arrangement and combination of parts more fully hereinafter described, claimed and illustrated in the accompanying drawings in which:

Figure 1:
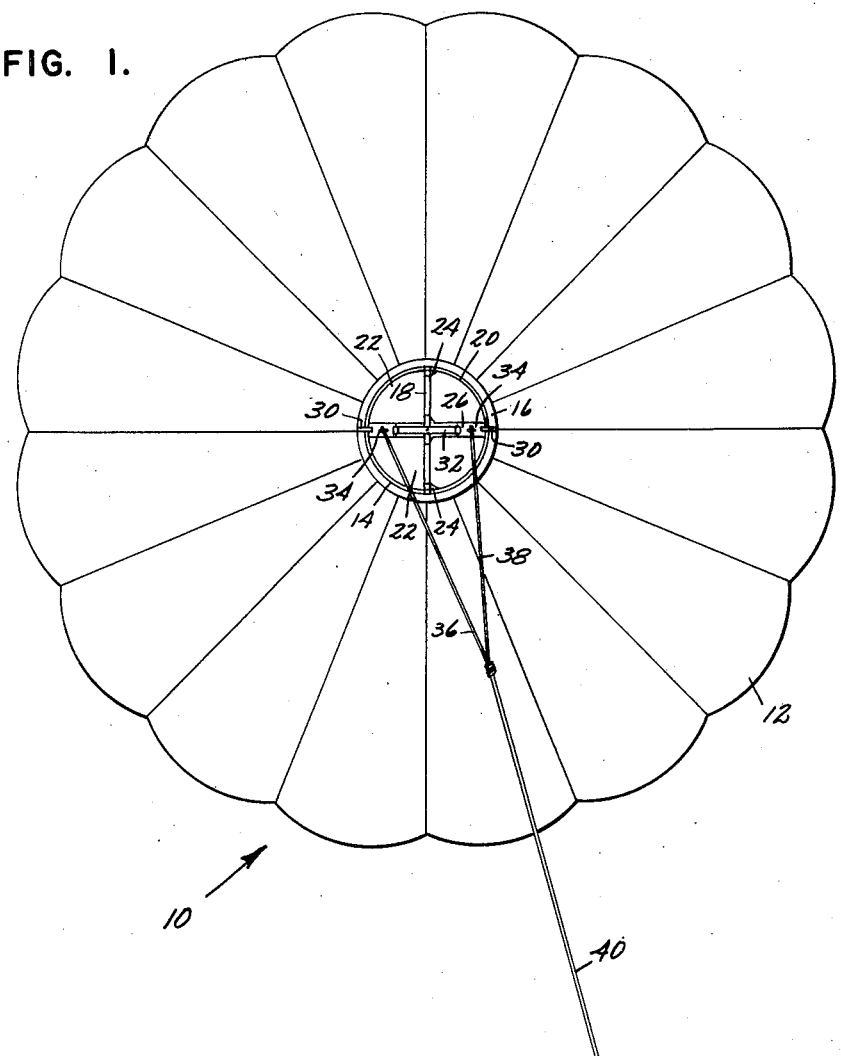
Figure 1 is an elevational view of an embodiment of the invention.
Figure 4:
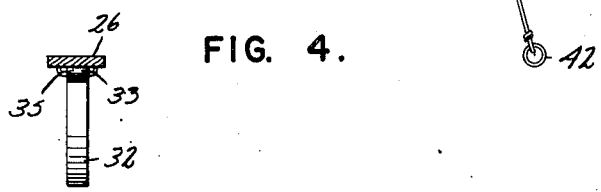
Figure 4 is a sectional view of the method of attaching the spring to the hinge.
Figure 2:
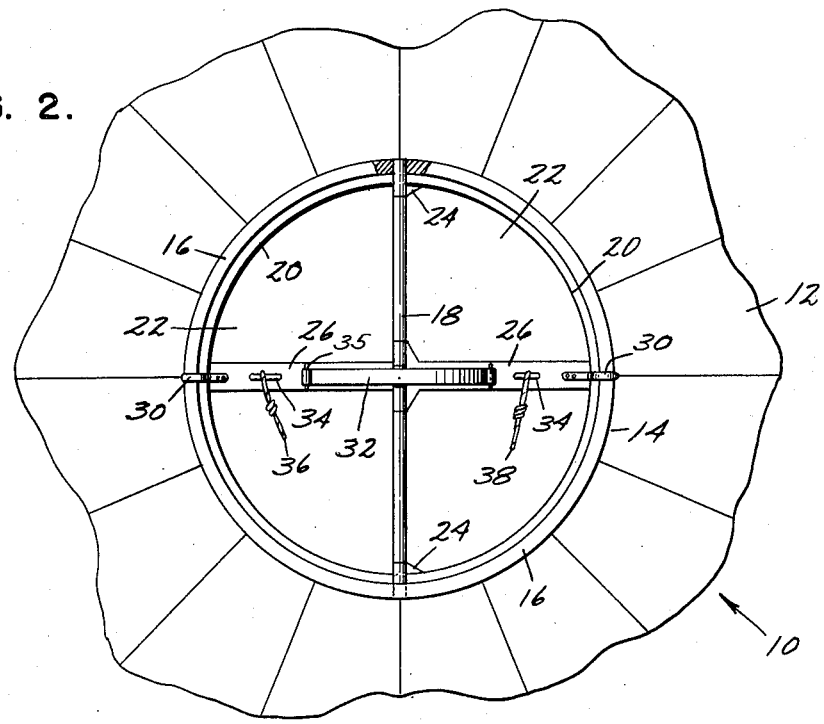
Figure 2 is an enlarged detailed plan view of the control per se.
Figure 3:
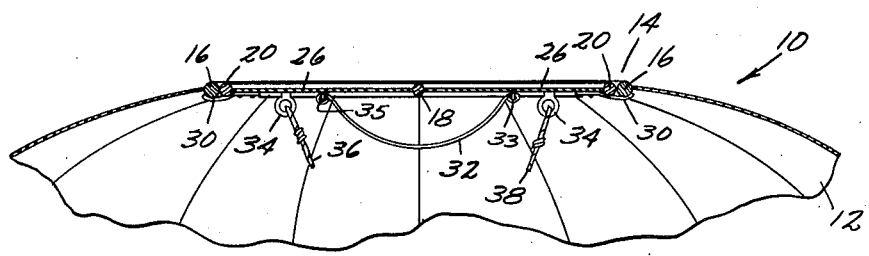
Figure 3 is a side view thereof.

Referring more in detail to the drawings the numeral 10 designates the canopy or parachute body made of fabric and divided into gores 12. Centrally of the body 10 there is provided an air escape port 14 which is provided with the marginal ring 16. Journalled transversely of the ring 16 is the axle or pintle 18 on which the semi-circular rings 20 of the valve partitions 22 are hingedly mounted by means of the hinges 24. Extending transversely of the ring 20 is the hinge 26, the leaves of which are secured to the center of the rings 20 and the partitions 22 being made of the same material as the body 10 are secured to the ring 16 and hinge 26 in any well known manner. Hooks 30 secured to the outer end of the leaves of the hinge 26 contact the ring 16 and retain the partitions in closed relation to the port 14. A bowed spring 32 extends downwardly with relation to the hinge 26 and is connected to the leaves thereof by loops 33 formed by turning the ends of the springs backward upon themselves and receiving staples 35 secured to the spring on opposite sides of pintle 18. The spring tensions the hinge and retains the partitions in closed position with relation to the port 14. Eyes 34 are formed on the hinge 26 intermediate the hooks 30 and the ends of the spring 32 to which are connected the control cords 36 and 38 for controlling the partitions 22.

The cords terminate in a single cord 40 having a pull loop 42 connected thereto at the free end thereof.

When the parachute is folded for use the hooks 30 are fastened to the ring 16 to prevent fouling of the parachute and partitions when the parachute is unfolded.

The loop 42 is positioned so that it is within easy reach of the parachutist.

As soon as the parachute has unfolded and there is a necessity for a quick descent a pull on the loop 42 will open the partitions, if it is desired to decrease the speed of descent, the partitions are permitted to close by slackening the control ropes therefore and the tensioning of the bowed spring will close the partitions and the partitions will be retained in place by means of the hooks 30.

The elements of the parachutes are all made of light material and a chute has been provided that will shorten the time required for the descent of a parachutist.

It is believed that the operation of the device will be apparent to those skilled in the art and it is to be understood that changes in the details of construction, arrangement and combination of parts may be resorted to without departing from the spirit of the invention and the scope of the appended claim.

Having thus described the invention, what is claimed as new and desired to be secured by Letters Patent is:

In a control for a parachute having an opening in its top, the improvement comprising, a ring secured to said parachute and outlining the opening, a rod journalled in said ring transversely of said opening, hinged leaves pivotally mounted on said rod centrally thereof, a semi-circular partition secured to each hinged leaf within said ring, a hook on the end of each hinged leaf engaging said ring to retain said hinged leaves detachably connected to said ring, a bowed spring overlying the rod and fixed at its ends to said hinged leaves and said spring adapted to urge the hooks on the ends of each hinged leaf into engagement with the ring and the partition in closed relation to the ring, an eye bolt secured to each hinged leaf intermediate of the hooks thereon and the end of the spring fixed thereto, and a control cable connected to each eye bolt and adapted upon movement thereof to open said partitions in relation to said ring.

LUIS ALBERTO VILLAFUERTE ROZAS.

REFERENCES CITED

The following references are of record in the file of this patent:

UNITED STATES PATENTS

| Number | Name | Date |
| --- | --- | --- |
| 1,283,773 | Honeywell | Nov. 5, 1918 |
| 1,413,371 | Adler | Apr. 18, 1922 |
| 1,477,163 | Barton | Dec. 11, 1923 |